Oct. 20, 1931.  S. DOROGHY  1,828,131
BAND SAW GUIDE
Filed Nov. 27, 1929  2 Sheets-Sheet 1
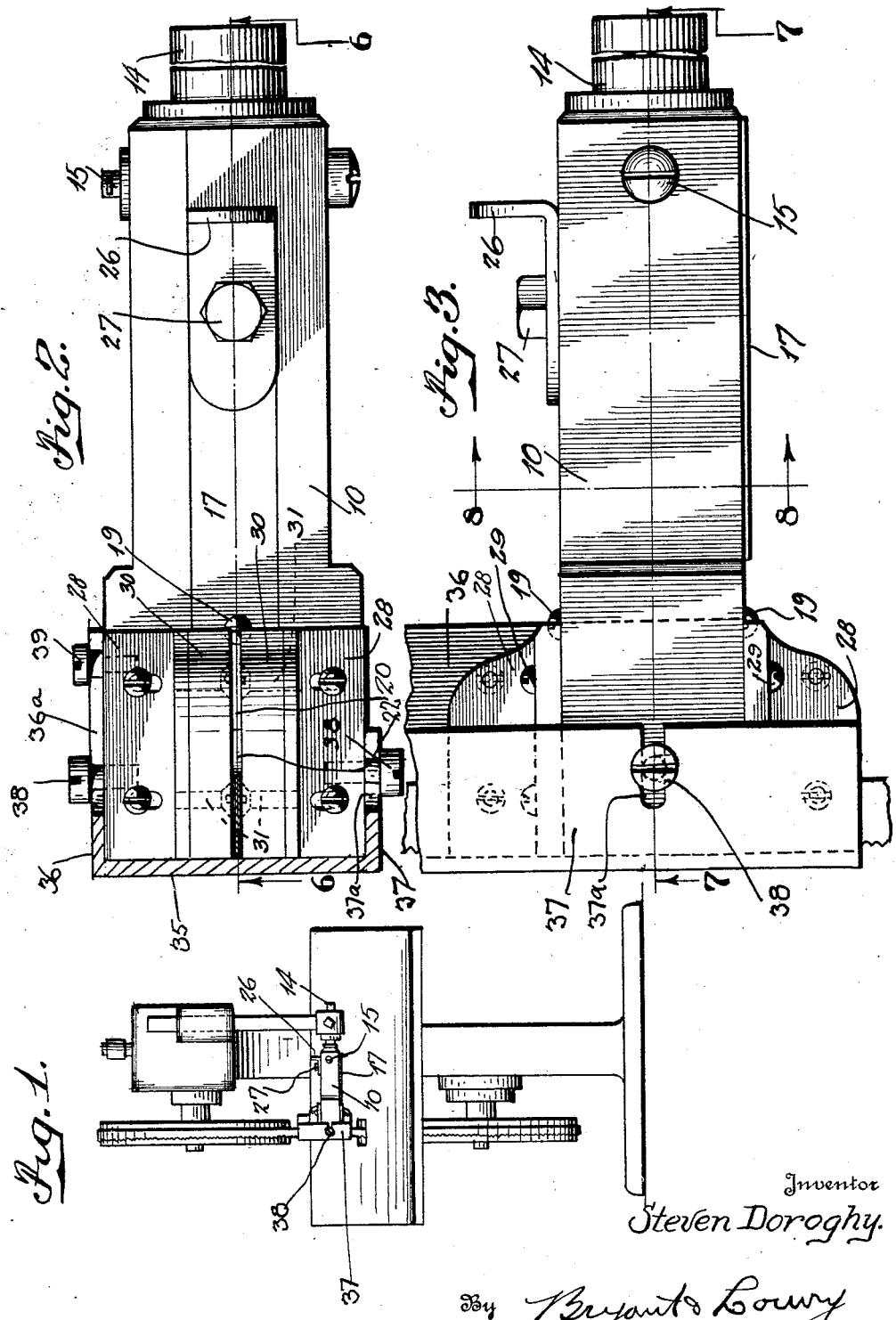
Inventor
Steven Doroghy.
By Bryant & Lowry
Attorneys Oct. 20, 1931.  S. DOROGHY  1,828,131
BAND SAW GUIDE
Filed Nov. 27, 1929   2 Sheets-Sheet 2
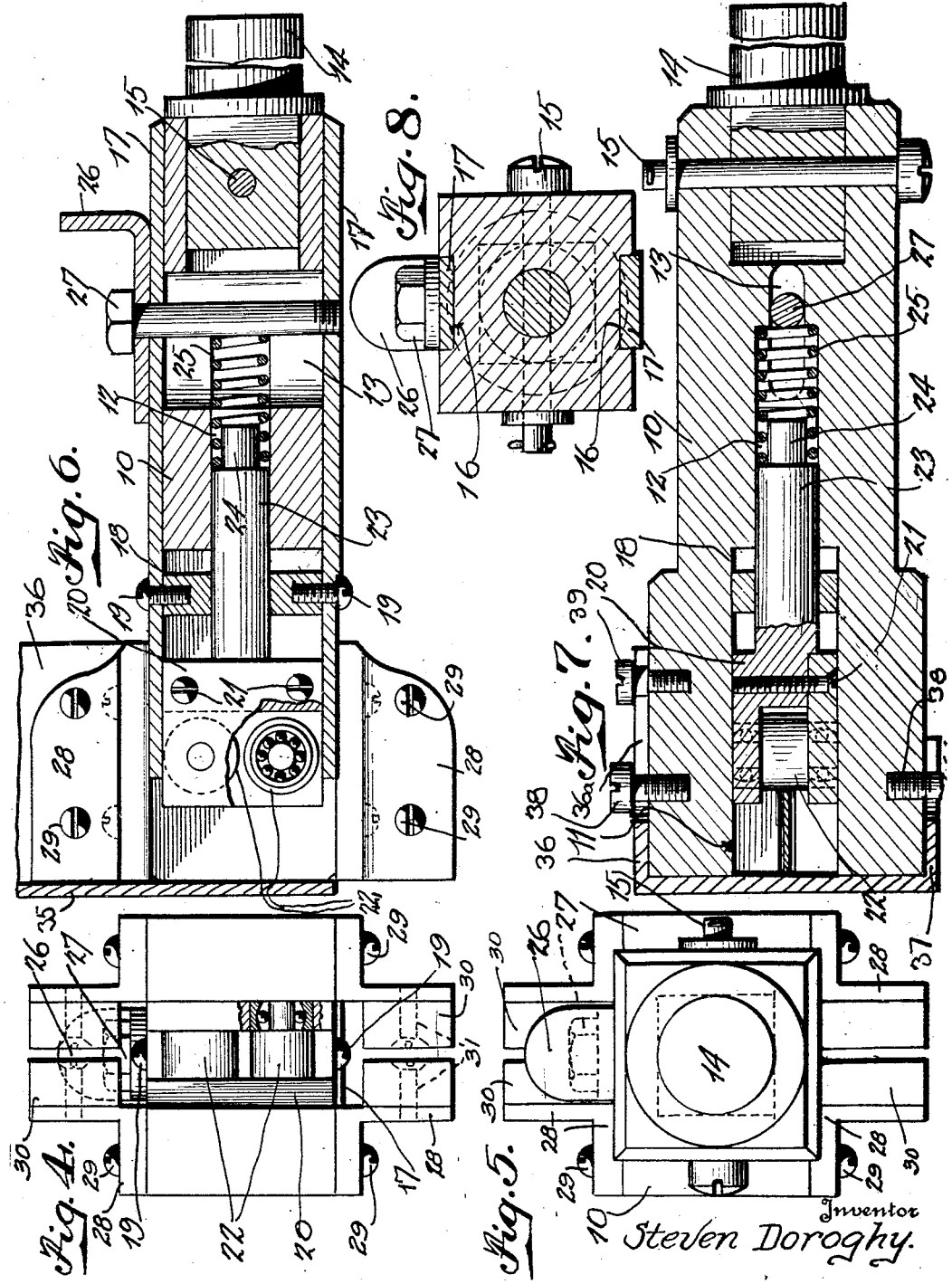
Inventor
Steven Doroghy.
By Bryant & Lowry
Attorneys Patented Oct. 20, 1931

1,828,131

UNITED STATES PATENT OFFICE

STEVEN DOROGHY, OF BUFFALO, NEW YORK

BAND SAW GUIDE

Application filed November 27, 1929. Serial No. 410,128.

This invention relates to saw guides for the band saws of band sawing machines.

One important object of the invention is to improve the general construction of devices of this character.

A second important object of the invention is to provide an improved form of band saw guide especially adapted to prevent a band saw guided thereby from sagging and rubbing against the housing and thus wearing out the saw more quickly than would happen under proper usage.

A third important object of the invention is to provide a novel form of band saw guide wherein the friction of the saw through the guide will be so reduced as to prevent heating beyond the temperature at which the temper of the saw will be drawn and by this means to prevent rapid breaking of the saw.

A fourth important object of the invention is to provide an improved form of bandsaw guide wherein the guide may be adjusted for any desired thickness and width of saw.

A fifth important object of the invention is to provide a novel adjustable cushioning means in such a guide, the means being arranged to yieldably support the same against the pressure of the work.

With the above and other objects in view as will be presently understood, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a side elevation of a band sawing machine showing the invention applied thereto;

Figure 2 is a plan view of the improved guide;

Figure 3 is a side elevation of the improved guide;

Figure 4 is a front elevation of the improved guide;

Figure 5 is a rear elevation thereof;

Figure 6 is a section on the line 6—6 of Figure 2;

Figure 7 is a section on the line 7—7 of Figure 3; and

Figure 8 is a section on the line 8—8 of Figure 3.

In the invention as here shown there is disclosed a body 10 of general rectangular cross section and in the forward end of this body there is provided a vertical slot 11. Extending rearwardly from the inner end of this slot is a bore 12 and across the rear end of this bore extends a second vertical slot 13, this last slot being of less width than the diameter of the bore. Also the rear end of this body is provided with a socket for the reception of the squared forward end of a supporting arm 14, the arm being held in the body by means of a bolt 15 extending from side to side of the body through the squared end aforesaid.

In the top and bottom surfaces of the rear portion of the body are formed channels 16 wherein are slidably mounted adjusting plates 17. The forward ends of these plates extend into the slot 11 at the top and bottom thereof and between these forward portions is a vertical plate 18 to which the plates 17 are secured by the screws 19 so that the two plates 17 and the plate 18 move together in unison. Between these forward ends and the side walls of the slot 11 slides a forked presser head 20 one side of which is removable and secured in position by screws 21 so as to permit the assembly in the fork of this presser head of the ball bearing supported rollers 22 which, it will be noted are arranged with their axes parallel and disposed vertically one above the other. This presser head is provided with a rearwardly extending shank 23 which passes slidably through a suitable opening in the plate 18 and is provided at its rear end with an abrupt shouldered reduction 24 for the engagement of the front end of a presser spring 25. On top of the upper plate 17 is a finger piece 26 and through this finger piece and the upper slide or adjusting plate 17 passes a bolt 27 which extends downwardly through the slot 13 and has its lower end screwed into the lower slide or adjusting plate 17. By means of this bolt the slides 17 may be clamped in desired position on the body 10 and also the bolt forms an adjustable abutment for the rear end of the spring 25. By this means the anti-friction rollers 22 may be adjusted for any width of saw and to exert any desired degree of pressure on the back of the saw while at the same time permitting a certain amount of yielding of the blade when the work is pressed against its cutting edge.

In order to accommodate different thicknesses of saw blades while at the same time properly guiding the blade used there has been provided certain lateral guides which consist of pairs of L-shaped or angle brackets 28 secured adjustably to the top and bottom edges of the forked portion of the body by screws 29 and these brackets have wear plates or blocks 30 replaceably secured to their confronting faces by screws 31. Thus by adjusting these brackets toward and from each other any thickness of saw blade may be properly guided laterally and prevented from twisting.

A guard for the band saw blade is associated with the guide, the guard being of channel formation and including a front wall 35 positioned forwardly of the guide and side walls 36 and 37 inclosing opposite sides of the guide and extending upwardly from a point adjacent the saw table as shown in Figure 1 to a point adjacent the upper guide wheel for the band saw. The side walls 36 and 37 are slotted as at 36a and 37a with which adjusting screws 38 and 39 are associated, the screws 38 being threaded into the adjacent portions of the bead through the slots 36a and 37a with the screw heads engaged with the side walls to anchor the guard in position. The screw 39 includes a squared shank portion to guide the guard in its movements of adjustment. The guard is adjustable toward and away from the guide to accommodate the passage through the guide of band saws of different widths.

There has thus been provided a simple and efficient device of the kind described and for the purpose specified.

It is obvious that many minor changes may be made in the form and construction of the invention without departing from the material principles thereof. It is not, therefore desired to confine the invention to the exact form herein shown and described, but it is wished to include all such as properly come within the scope claimed.

Having thus described my invention, what is claimed as new is:—

A band saw guide comprising a body member having a vertical slot in its forward end, a second vertical slot in its rear end, a bore extending through the body member between the slots, and longitudinal channels in the upper and lower surfaces of said body member, longitudinally adjustable plates mounted in said body member channels; a forked presser head mounted in the forward slot and having one side removable, ball bearing rollers mounted in said presser head, and adapted to bear against the edge of a band saw, a rearwardly extending stem in the slot-connecting bore and connected with said presser head, a plate secured to and between the said adjustable plates and having an opening through which said stem passes, means for manually adjusting said adjustable plates, a spring bearing against said stem and means positioned in the rear slot for adjusting said spring through the movement of said adjustable plates.

In testimony whereof I affix my signature.

STEVEN DOROGHY.